United States Patent [19]

Oka et al.

[11] 4,323,757

[45] Apr. 6, 1982

[54] METHOD FOR CUTTING SPECIFIC LAYER OF SYNTHETIC RESIN LAMINATED FILM

[75] Inventors: Yoshitake Oka, Kyoto; Tetsuo Ishihara, Itami; Masane Suzuki; Motonori Kanaya, both of Ohmiya, all of Japan

[73] Assignee: Daicel Chemical Industries, Ltd., Osaka, Japan

[21] Appl. No.: 174,065

[22] Filed: Jul. 31, 1980

[30] Foreign Application Priority Data

Aug. 3, 1979 [JP] Japan .................................. 54/99315

[51] Int. Cl.³ ............................................ B23K 27/00
[52] U.S. Cl. ...................... 219/121 LN; 219/121 LG; 219/121 FS
[58] Field of Search .................. 219/121 LN, 121 LG, 219/121 LH, 121 LJ, 121 FS, 121 LM, 121 L, 121 LW, 121 LY

[56] References Cited

U.S. PATENT DOCUMENTS

| | | |
|---|---|---|
| 3,262,122 | 7/1966 | Fleisher et al. .............. 19/121 LJ X |
| 3,435,186 | 3/1969 | Roshon, Jr. et al. ........ 219/121 LJX |
| 3,629,546 | 12/1971 | Fry ........................... 219/121 LC X |
| 3,668,028 | 6/1972 | Short ........................ 219/121 LJ X |
| 3,790,744 | 2/1974 | Bowen ........................ 219/121 LJ |
| 3,889,272 | 6/1975 | Lou et al. .................. 219/121 LJX |
| 3,909,582 | 9/1975 | Bowen ....................... 219/121 LM X |

*Primary Examiner*—C. L. Albritton
*Attorney, Agent, or Firm*—Blanchard, Flynn, Thiel, Boutell & Tanis

[57] ABSTRACT

A method for cutting a specific layer of a synthetic resin laminated film comprising at least two kinds of closely laminated synthetic resin material film layers having spectral absorption characteristics different from each other, which comprises placing the focus of a laser ray having a wavelength that enables the laser ray to be absorbed by the specific film layer to be cut and transmitted through the film layer not to be cut, on said specific film layer directly or through the other transmitting film layer; and moving the focus of the laser ray on the plane of said specific film layer, moving said specific film layer on the plane of said specific film layer under a stationary laser focus, or forcing the focus and said specific film layer, respectively, to move in conjunction, keeping the focus on the plane of said specific film layer, whereby said specific film layer only will be selectively cut along the predetermined line or curve.

14 Claims, 2 Drawing Figures

METHOD FOR CUTTING SPECIFIC LAYER OF SYNTHETIC RESIN LAMINATED FILM

BACKGROUND OF THE INVENTION

This invention relates to a method for cutting precisely a specific layer of a synthetic resin laminated film that is generally called a "strippable film" or "strip coat", along a line as desired.

DESCRIPTION OF THE PRIOR ART

Strippable films are employed in a variety of arts, such as in the preparation of photomask original images for use in photomechanical processes or in the production of an IC pattern, and as an original image material. A typical form of the strippable film is a laminated film consisting of two kinds of tightly combined synthetic resin material film layers having selectivities such that the absorption characteristics of each are different from the other. The strippable film of this type can be utilized so that a certain portion can be cut out of the single layer so as to separate out a predetermined pattern The reasons why the strippable film consists of two layers with spectral properties different from each other are that the formed pattern remaining on the strippable film can be differentiated with a high contrast from the base film, and that the remaining pattern can be utilized as a photographic mask. Accordingly, a typical strippable film consists, for instance, of a base film of polyester material which is transparent in the visible area and a coating film of the polyvinyl chloride resin material colored red to transmit the red light and absorb other light, which is overlaid on the base film.

Examples of the film materials employed in the conventional type strippable film include a straight chain polyester such as polyethylene terephthalate, a polyolefin such as polypropylene or polyethylene, a polyamide such as nylon 6, polyvinyl chloride, polyvinyl alcohol, polyvinyl formal, polystyrene, polyacrylonitrile, polymethylmethacrylate, an ionomer, polyvinylidene chloride, a flourinated ethylene-propylene copolymer, an ethylene-vinyl acetate copolymer and a cellulosic resin such as cellulose acetate. Furthermore, various elastomers such as natural rubber and synthetic rubbers can be utilized as the materials of the coating film.

The color of the coating film is not limited to the above-described red, and other colors likewise can be optionally utilized by the use of appropriate coloring agents. The base film is also not limited to a transparent material.

In the conventional technology, a so-called cutter, such as a metallic knife, is employed to cut one layer of the tightly laminated film along the predetermined line. The procedures involving the use of the cutter are relatively simple, and can be applied satisfactorily to the procedure for cutting a simple line with no advanced skill. However, if the desired pattern is of a complex shape, that is, the line along which the cutter has to be run is a complicated one, or if high precision is required in the procedure, the cutting procedure necessarily requires skills of a high order. Moreover, such complicated processes necessarily involve an increase in the number of working stages, and this increase causes disadvantages in the yield, working procedures and the cost for the production. The cutting procedure inherently involves cutting the desired single layer only and, leaving the other layer untouched. Therefore, a number of complicated steps such as adjustment of the cutting pressure applied to the film in the course of the cutting procedure, and adjustment of the position of the blade of the cutter along the depth direction, are required.

The directionality of the blade of a cutter also gives rise to problems. The directionality of the blade generally causes no trouble in the cutting of a straight line. However, if cutting is attempted along a sharply turned line or a complicated line, the direction of the blade has to be altered sharply and subsequently adjusted to follow the predetermined line. If the cutting procedure is applied to a curved line, continuous alteration of the direction of the blade is necessary. This continuous alteration of the blade necessarily involves extremely complicated and difficult procedures.

SUMMARY OF THE INVENTION

In view of the drawbacks of the conventional method, a primary object of the present invention is to provide a method for cutting a specific layer of a synthetic resin laminated film such as a strippable film quickly and precisely along an optionally selected line without need for advanced cutting skills.

Other objects of the invention are obvious from the contents of the present specification and claims.

The method of the present invention has been invented upon careful observation on the drawbacks of the conventional method, which are inherently brought about by the use of a cutter wherein a blade must be applied directly to the line on the film material. The method of the invention, in contrast to the conventional method, employs a cutting means entirely different from the conventional cutter. The cutting means to be employed in the present invention is a laser ray having a wave-length in a certain range, and this range is selected to correspond to the optical characteristics of the specific film layer of the laminated film material to be cut. Thus, the cutting means of the present invention is able to cut the film material with no physical contact to the material.

Accordingly, this invention is a method for cutting a specific layer of a synthetic resin laminated film comprising at least two kinds of tightly laminated synthetic resin layers having spectral absorption characteristics different from each other, which comprises placing the focus of a laser ray having a wave-length that enables the laser ray to be absorbed by the specific film layer to be cut and transmitted through the film layer not to be cut, on said specific film layer directly or through the other transmitting film layer; and moving the focal point of the laser ray on the plane of said specific film layer, moving said specific film layer on the plane of said specific film layer under a stationary laser focal point, or focing the focal point and said specific film layer, respectively, to move in conjunction, keeping the focal point on the plane of said specific film layer, whereby said specific film layer only will be selectively cut along the predetermined line.

In the specification and claims, the term "line" is used to mean straight line, turned line, curved line, etc., with simple or complicated form, and therefore there is no limitation on the form or shape of the line, unless otherwise specified.

DESCRIPTION OF PREFERRED EMBODIMENTS

Figure 1:
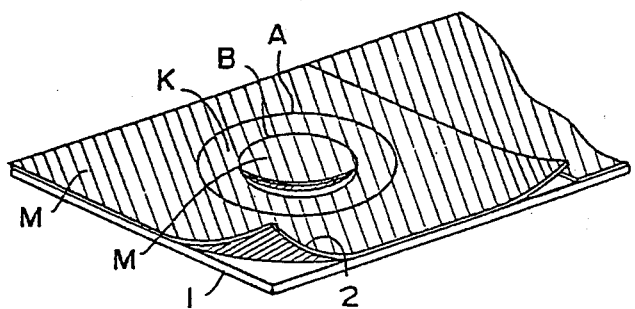
FIG. 1 is a sketch of a typical strippable film to be subjected to the treatment of the method of the present invention.

In FIG. 1, which shows a typical strippable film that is an example of the synthetic resin laminated film to be subjected to the treatment of the method of the present invention, a transparent base film 1 is tightly placed on a coating film 2 and processed in an appropriate manner to form a laminated film. The term "transparency" means that the film material has no wave-length selectivity in the visible light area. The coating film 2 is selected, for instance, to have wavelength selectivity that allows transmission of red light and absorption of other light. The procedure employed for laminating tightly the coating film on the base film can be selected from those involving adhering the coating film onto the base film, dipping the base film into a liquid solution containing the coating film material and then pulling it up, or coating a liquid solution containing the coating film material on the base film. The so-laminated film generally has a thickness ranging from about 30 to 300 microns, and the coating film has a thickness generally ranging only from about 5 to 50 microns.

When a doughnut shaped pattern is to be formed on the strippable film illustrated on FIG. 1, a couple of circular cutting lines A and B are initially formed on the coating film 2. Subsequently, the coating film in the M areas is removed from the laminated film, holding the coating film in the K area on the base film, so as to form the desired doughnut shaped pattern on the base film.

Figure 2:
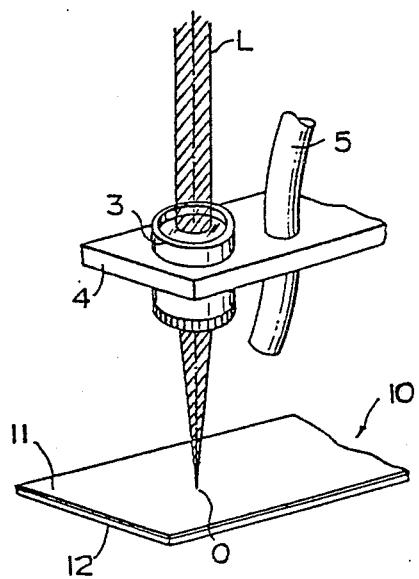
FIG. 2 is a sketch of a typical cutting means to be employed in an application of the method of the present invention.

In FIG. 2, which shows a sketch of an example of the cutting means to be employed for carrying out the method of the present invention, a convergent lens 3 for placing the focus of a laser ray L emitted from a laser ray source (not illustrated) on the plane of a strippable film 10 is supported on a supporting device 4. The supporting device 4 also supports an assistant gas pipe 5. The free end of the gas pipe 5 is positioned to direct towards the beam focal point on the strippable film.

A variety of laser ray sources can be utilized in the application of the method of the invention. Among them, an appropriate source is an argon gas laser source emitting a laser ray in the range from purple through yellow green, or a krypton gas laser source emitting a laser ray in the range from purple through crimson.

Either of these laser sources can emit laser rays of different frequencies from a single laser source by adjustment of the oscillating device. Therefore, a laser ray of a frequency corresponding to the wave-length selectivity of the strippable film to be applied can be readily produced.

If the coating film 11 and the base film 12 of the strippable film 10 have optical characteristics different from each other, that is, the coating film transmits red light and absorbs other colors of light, while the base film transmits all visible light, as described above, the laser source is adjusted to emit a laser ray in a range other than that of red light, namely, a laser ray absorbed only by the coating film. Thus, the laser energy can be given to the coating film only, without affecting the base film.

The cutting of a specific layer of a synthetic resin laminated film, such as a strippable film, by means of the cutting means illustrated in FIG. 2 can be carried out in the following manner. The laser ray L is, in the first place, focused on the strippable film 10 by adjusting the convergent lens 3. Then, the strippable film 10 is moved on the plane, so that the desired cutting line runs on the focal point. A continuously cut line is thus provided by the focused laser ray. Alternatively, the laser ray can be moved along the desired cutting line while strippable film 10 is held stationary so as to obtain a continuously cut line with the aid of guiding flexible optical fiber or the like.

Since the cutting of the strippable film by means of the laser ray is based on the partial fusion of the material of the coating film by the applied thermal energy, smoke containing the evaporated substances given by the thermal decomposition of the coating film material at the cutting spot is sometimes produced. If this smoke drifts in the vicinity of the cutting spot so as to be in the path of the laser ray, the laser ray is likely to be absorbed or scattered. Moreover, the evaporated substance contained in the smoke is likely to become stuck on the surface of the convergent lens. These phenomena result in a decrease of the energy of the laser ray applied to the cutting spot on the strippable film. This decrease in energy is likely to cause uneven cutting conditions, and the convergent lens may sometimes break when subjected to these conditions. To cope with this disadvantageous phenomenon, an assistant gas such as air or nitrogen gas can be blown to the cutting spot and its vicinity by means of, for instance, the assistant gas pipe 5 illustrated in FIG. 2. Alternatively, the air on or around the cutting spot can be sucked away by an appropriate means, such as a pipe in the same shape as the assistant gas pipe 5. These pipes can naturally be made in other shapes. When the influence of the smoke is not detrimentally strong, a conventional blower can be provided in the neighborhood of the cutting spot to blow the smoke off.

Another advantage of the present invention is that the laser ray employed to provide the energy for cutting can be readily adjusted to control optionally the energy density applied to the material, the amount of the energy given to the strippable film, or the width of the line to be cut. The use of the laser ray is also advantageous in that almost all of the procedure employed for the cutting can be carried out with a single oscillating device, because an appropriate frequency of the laser ray can be readily selected for application to the strippable film, and further because a laser ray of a different oscillating frequency can be emitted by a single oscillating device. In practice, the laser ray is selected to have a wave length corresponding to the wave length absorbed by the material to be treated. The energy emitted by the laser and the scanning speed of the laser ray, as well as the movement rate of the material to be treated, can be adjusted so that the energy given to the material is sufficient to treat a material having a given selected thickness and nature. The width of the line to be cut can be modified by varying slightly the diameter of the focal spot by adjustment of the convergent lens. However, when the diameter is increased by the adjustment of the lens, the energy density given to the cutting spot necessarily decreases. To avoid such a decrease of the energy density, an appropriate measure must be taken, such as elevation of the energy output of the laser device, or reduction of the scanning speed of the laser ray or of the moving rate of the material. The width of the line to be cut can be reduced to 20–30$\mu$ under the best focus conditions. This means that the cutting method of the present invention enables the material to be processed more finely than in the conventional method using a cutter.

Since the method of the present invention utilizes, as described hereinbefore, a laser ray for cutting a specific layer of the synthetic resin laminated film, the cutting procedure can be practiced on the predetermined specific layer in the absence of contact with the energy source and with absolutely no influence on the other layer(s). The use of the laser ray allows the user to observe and record in digital form the principal factors, such as the focus, the output and the oscillating frequency of the laser ray, which are closely related to the appearance of the finish of the cutting. The conditions for the cutting procedure can therefore be continuously controlled, and changes in the conditions, such as replacement of the material to be cut, variation of the thickness of the material, and the like, can be easily followed by adjustment of the quantified level of the laser ray. Another advantage of the invention is that the radiation of the laser ray can be applied to the film from any direction. For instance, it can be applied directly to the specific layer to be cut or it can be applied through another layer to be kept unprocessed, when the intervening layer is selected so that the laser ray has no adverse effect on that layer.

The method of the present invention can be practiced when the laser ray is radiated horizontally to reach vertically positioned film. This embodiment of the method of the invention has an advantage in that the aforementioned assistant gas pipe can be replaced with a simple blower. This is possible because the gas produced from the film material escapes upwardly, and its adverse effect on the cutting procedure is not as great.

In the attached drawing, the synthetic resin laminated film simply consists of two kinds of film layers, as generally is the case for conventional strippable film. However, it is understood that the method of the present invention can be applied to any type of synthetic resin laminated film comprising at least two kinds of tightly laminated synthetic resin material film layers, as long as the specific film layer to be processed is provided on a surface of a laminated film and has spectral absorption characteristics different from the other layer(s). The method of the present process accordingly can be satisfactorily applied to cut a predetermined specific film layer not only of a conventional strippable film, but also of a variety of synthetic resin laminated films.

As with the red coating film that has been shown above, it is preferred in the invention that the strippable film contain a coloring matter such as pigments and dyes, especially in blue, green and red. Also carbon black may be used.

What is claimed is:

1. A cutting method, which comprises the steps of:
   providing a laminated film comprising at least two layers made of synthetic resin, wherein one of said layers is strippable from the other layer and contains coloring matter so that its spectral absorption characteristic is different from the spectral absorption characteristic of the other layer;
   focusing a laser beam on said one, strippable layer, said laser beam having a wave length such that it is absorbed by said one, strippable layer and is transmitted through said other layer;
   effecting relative movement between said laminated film and said laser beam along a predetermined path, while maintaining said laser beam focused on said one, strippable layer, so that said one layer is cut along a line whereby to form a cut pattern in said one layer, without cutting the other layer.

2. A method as claimed in claim 1, in which said one, strippable layer transmits red light and completely absorbs light of other wave lengths, said other layer transmits all visible light, and said laser beam has a wave length in a range other than that of red light, whereby the energy of said laser beam is absorbed only by said one, strippable layer.

3. A method as claimed in claim 1, in which said laser beam is emitted from an argon gas laser source.

4. A method as claimed in claim 1, in which said laser beam is emitted from a crypton gas laser source.

5. A method as claimed in claim 1, in which said laminated film is moved in the plane of said one, strippable layer under a stationary laser focused on said one, strippable layer.

6. A method as claimed in claim 1, in which smoke containing the evaporated substances procuded by the thermal decomposition of said one, strippable layer is blown off by applying a stream of an assistant gas.

7. A method as claimed in claim 6, in which the stream of an assistant gas is supplied by an assistant gas pipe provided near the cutting spot.

8. A method as claimed in claim 1, in which said laser beam is focused by means of a convergent lens.

9. A method as claimed in claim 1, in which said laser beam is directed horizontally against a vertically positioned laminated film.

10. A photomask original image prepared by the method as claimed in claim 2.

11. A method as claimed in claim 1, in which the laser focal point is scanned on the plane of said one, strippable layer while said laminated film is fixed and remains stationary.

12. A method as claimed in claim 1, including the additional step of stripping a cut portion or portions of said one, strippable layer from the remainder of said laminated film.

13. A photomask original image prepared by the method as claimed in claim 12.

14. A method as claimed in claim 1, in which said coloring matter is a pigment or dye.

* * * * *

UNITED STATES PATENT AND TRADEMARK OFFICE
CERTIFICATE OF CORRECTION

PATENT NO. : 4 323 757
DATED : April 6, 1982
INVENTOR(S) : Yoshitake Oka et al

It is certified that error appears in the above—identified patent and that said Letters Patent is hereby corrected as shown below:

Column 6, line 25; change "crypton" to ---krypton---.

Column 6, line 31; change "procuded" to ---produced---.

Signed and Sealed this

Third Day of August 1982

[SEAL]

Attest:

GERALD J. MOSSINGHOFF

*Attesting Officer*     *Commissioner of Patents and Trademarks*